United States Patent [19]

Ladouceur et al.

[11] Patent Number: 5,560,094

[45] Date of Patent: Oct. 1, 1996

[54] METHOD OF ATTACHING A FASTENER TO A PANEL

[75] Inventors: Harold A. Ladouceur, Livonia, Mich.; Rudolf R. M. Müller, Frankfurt, Germany

[73] Assignee: Multifastener Corporation, Detroit, Mich.

[21] Appl. No.: 344,955

[22] Filed: Nov. 25, 1994

Related U.S. Application Data

[60] Continuation-in-part of Ser. No. 92,593, Jul. 16, 1993, abandoned, which is a division of Ser. No. 888,580, May 26, 1992, Pat. No. 5,237,733, which is a continuation-in-part of Ser. No. 806,172, Dec. 12, 1991, Pat. No. 5,146,672, which is a division of Ser. No. 457,060, Dec. 26, 1989, Pat. No. 5,072,518, which is a division of Ser. No. 271,123, Nov. 14, 1988, Pat. No. 4,893,394, which is a division of Ser. No. 111,966, Oct. 21, 1987, Pat. No. 4,831,698, which is a continuation-in-part of Ser. No. 69,804, Aug. 17, 1987, Pat. No. 4,810,143, which is a division of Ser. No. 869,507, Jun. 2, 1986, Pat. No. 4,700,470, which is a division of Ser. No. 657,570, Oct. 4, 1984, Pat. No. 4,610,072, which is a continuation-in-part of Ser. No. 563,833, Dec. 21, 1983, Pat. No. 4,555,838, which is a continuation-in-part of Ser. No. 504,074, Jun. 14, 1983, Pat. No. 4,543,701, and a continuation-in-part of Ser. No. 485,099, Mar. 28, 1983, Pat. No. 4,459,073, which is a division of Ser. No. 229,274, Jan. 28, 1991, abandoned, said Ser. No. 504,074, Jun. 14, 1983, Pat. No. 4,543,701, is a continuation of Ser. No. 229,274, Jan. 28, 1991, abandoned.

[51] Int. Cl.⁶ .................................................. B23P 11/00
[52] U.S. Cl. .................................... 29/512; 29/243.518
[58] Field of Search ...................... 29/243.518, 243.519, 29/432.2, 509, 512, 798; 83/686

[56] References Cited

U.S. PATENT DOCUMENTS

| | | | |
|---|---|---|---|
| 2,808,108 | 10/1957 | Pellegrino | 83/686 |
| 3,143,026 | 8/1964 | Akerson | 83/686 |
| 4,610,072 | 9/1986 | Muller | 29/512 |
| 5,458,717 | 10/1995 | Kurita | 83/686 X |

FOREIGN PATENT DOCUMENTS

| | | | |
|---|---|---|---|
| 1225076 | 6/1960 | France | 83/686 |

*Primary Examiner*—S. Thomas Hughes
*Attorney, Agent, or Firm*—Howard & Howard

[57] ABSTRACT

An improved installation apparatus and method of attaching a female fastener element, such as a self-riveting nut fastener, to a metal panel, wherein a small hole is first formed in the panel and the annular riveting portion of the fastener is driven through the hole and locked to the panel. The improved method of this invention includes locating the fastener on the panel, then driving a tapered punch through the fastener board to pierce a small hole in the panel, then driving a conical exterior surface of the punch through the hole, to enlarge the hole, and substantially simultaneously driving the fastener riveting portion against the panel and through the panel opening into a die member to lock the fastener on the panel.

17 Claims, 3 Drawing Sheets

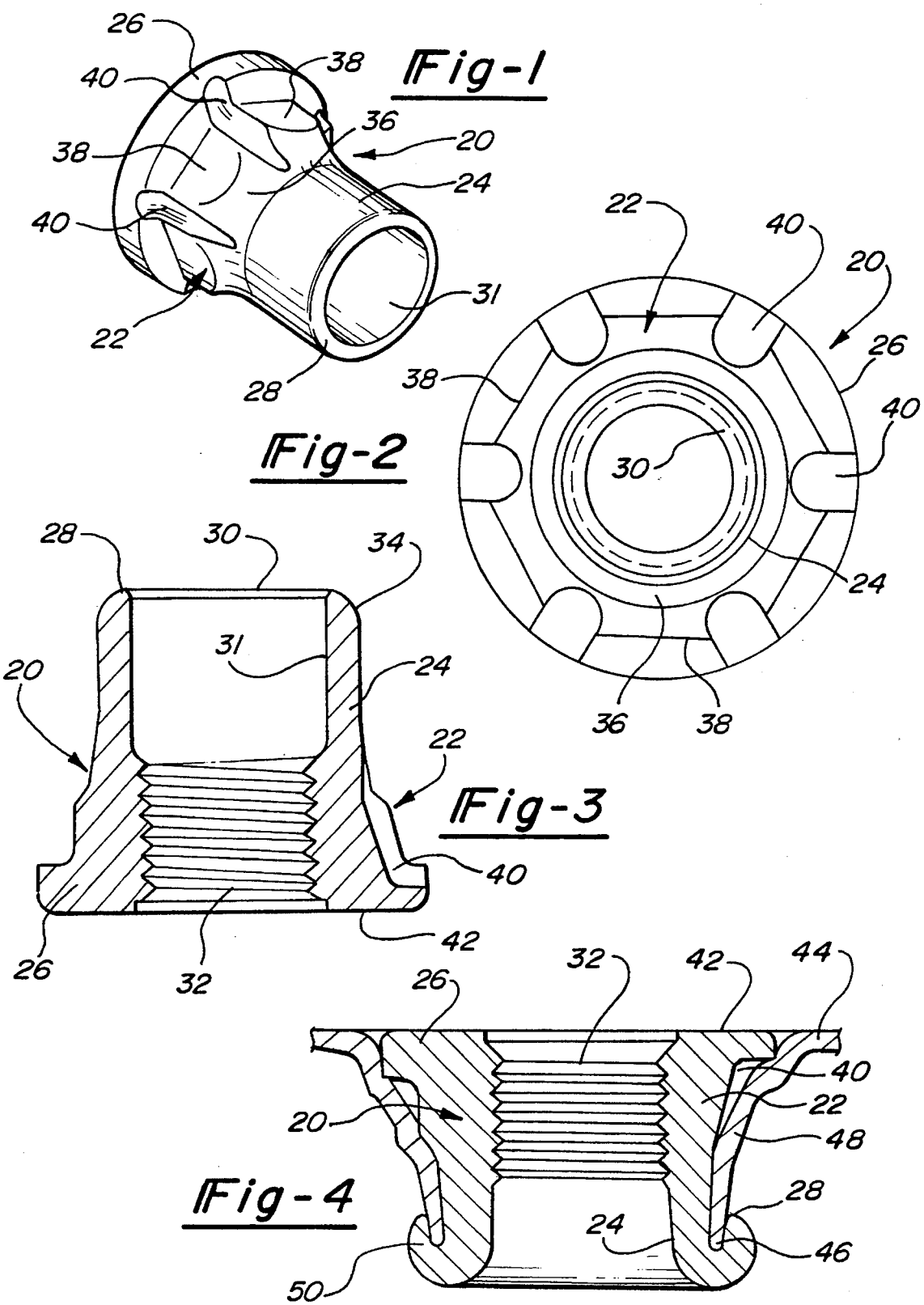

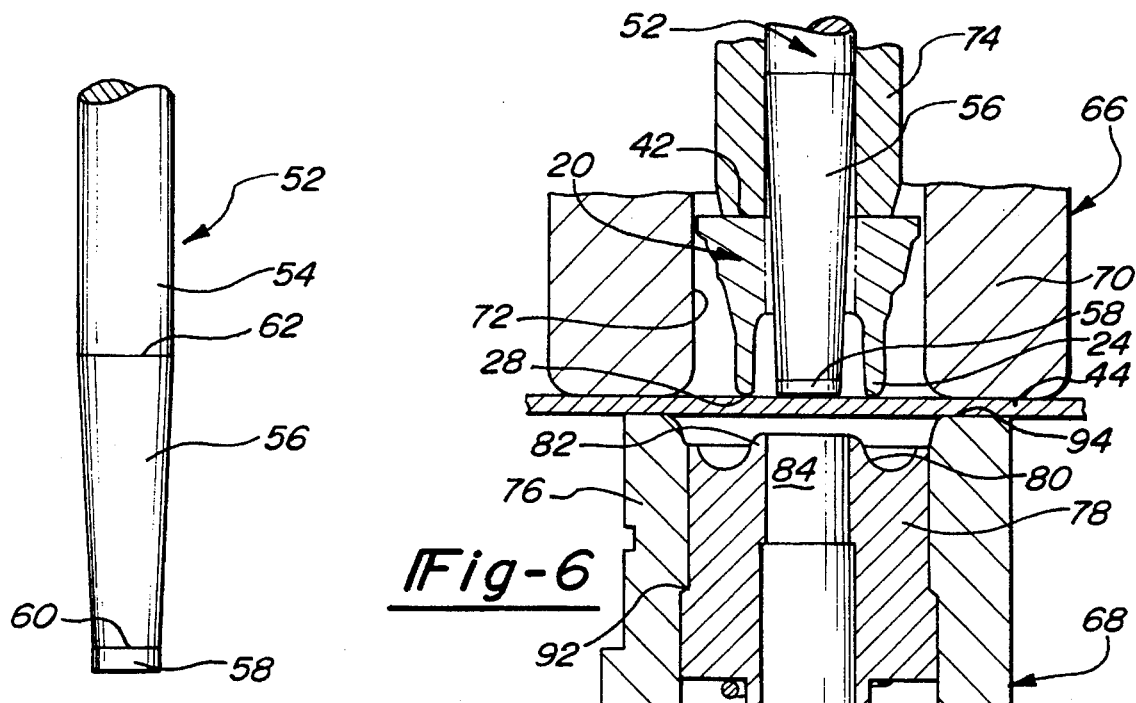
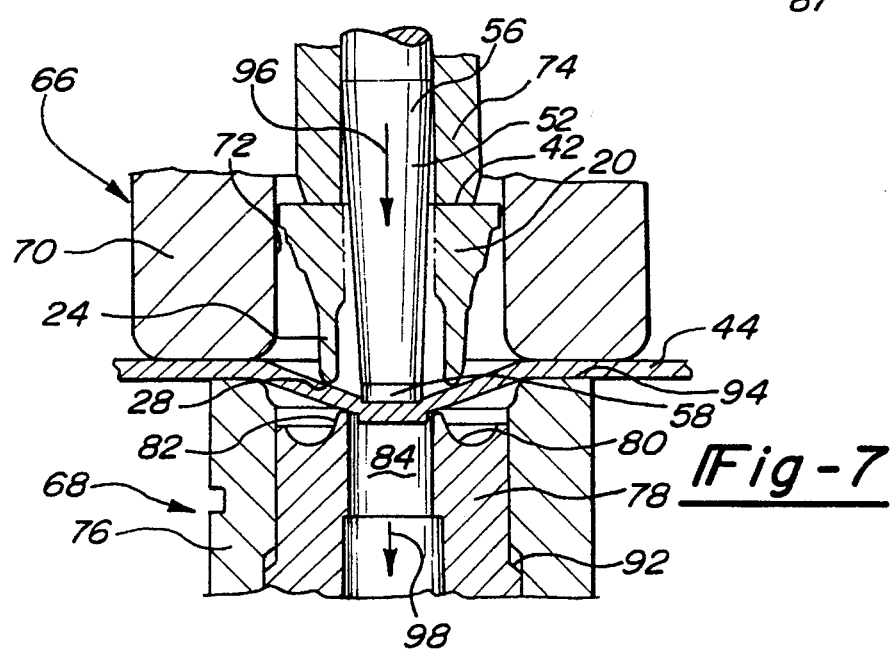

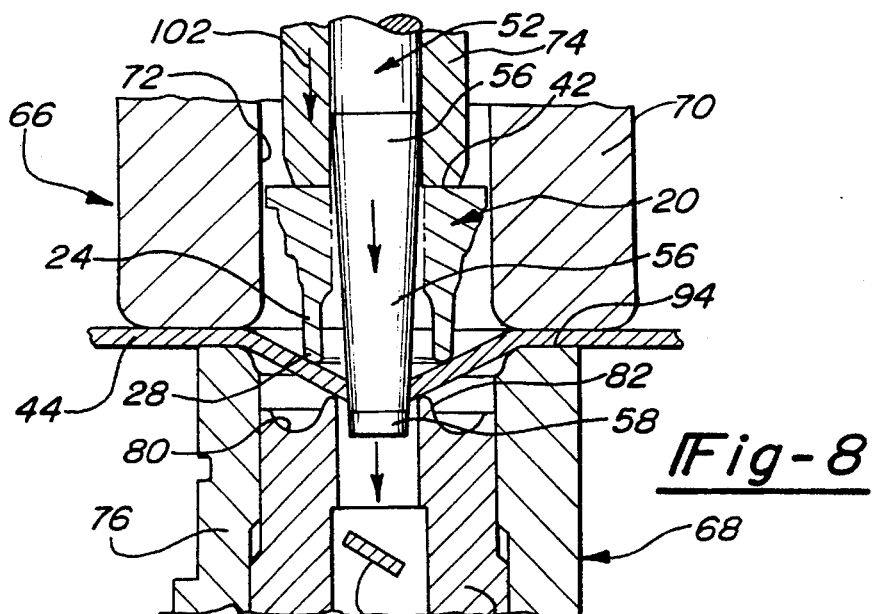
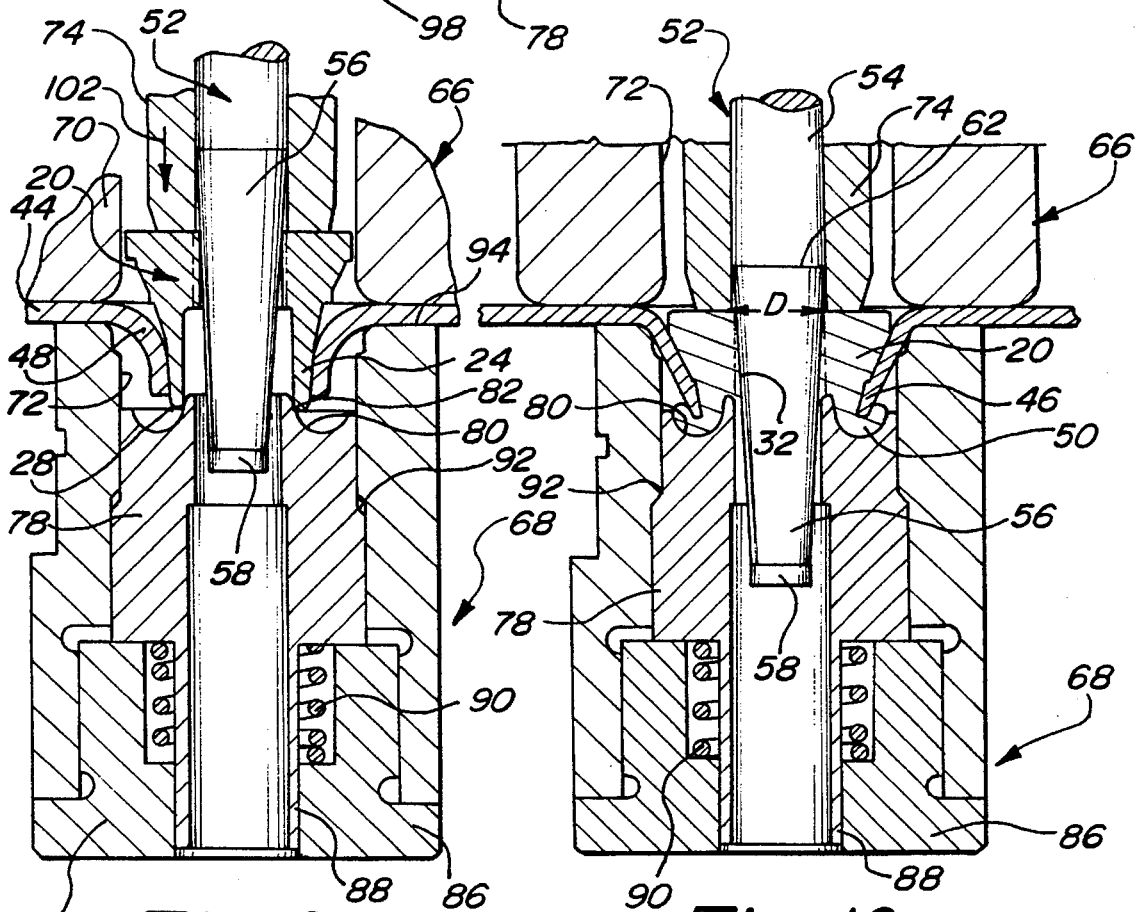

METHOD OF ATTACHING A FASTENER TO A PANEL

RELATED APPLICATIONS

This application is a continuation-in-part application of application Ser. No. 092,593, filed Jul. 16, 1993, now abandoned, which application was a divisional application of Ser. No. 888,580, filed May 26, 1992, now U.S. Pat. No. 5,237,733, which application was a continuation-in-part application Ser. No. 806,172, filed Dec. 12, 1991, now U.S. Pat. No. 5,146,672, which application was a divisional application of Ser. No. 457,060, filed Dec. 26, 1989, now U.S. Pat. No. 5,072,518, which was a divisional application of Ser. No. 271,123, filed Nov. 14, 1988, now U.S. Pat. No. 4,893,394, which was a division of Ser. No. 111,966, filed Oct. 21, 1987, now U.S. Pat. No. 4,831,698, which was a continuation-in-part of Ser. No. 069,804, filed Aug. 17, 1987, now U.S. Pat. No. 4,810,143, which was a division of Ser. No. 869,507, filed Jun. 2, 1986, now U.S. Pat. No. 4,700,470, which was a division of Ser. No. 657,570, filed Oct. 4, 1984, now U.S. Pat. No. 4,610,072, which was a continuation in part of Ser. No. 563,833, filed Dec. 21, 1983, now U.S. Pat. No. 4,555,838, which was a continuation-in-part of Ser. No. 504,074, filed Jun. 14, 1983, now U.S. Pat. No. 4,543,701, and a continuation-in-part of Ser. No. 485,099, filed Mar. 28, 1983, now U.S. Pat. No. 4,459,073. Ser. No. 504,074 was a continuation of Ser. No. 229,274, filed Jan. 28, 1991, now abandoned, and Ser. No. 485,099, was a division of Ser. No. 229,274, now abandoned. Ser. No. 229,274 claims priority to an application filed in the Federal Republic of Germany, No. 3,003,908, filed Feb. 2, 1980.

FIELD OF THE INVENTION

The present invention relates to an improved installation apparatus and method of attaching a female fastener element, such as a self-riveting nut fastener, to a metal panel, wherein a small hole is first formed in the panel by a piercing quill through the fastener bore and the annular riveting portion is then driven against the panel to enlarge the panel hole, then through the panel opening and locked to the panel in a female die member. The improved apparatus includes a tapered or conical punch which pierces an opening in the panel, then enlarges the panel opening to receive the riveting portion of the fastener.

BACKGROUND OF THE INVENTION

The present invention relates to improvements in the method of attaching self-attaching or self-riveting female fasteners and installation tooling which results in an improved installation of the fastener in a metal panel and reduces the likelihood of installation tooling breakdown or breakage of the piercing tool and female die member.

Self-piercing and self-clinching or riveting female fasteners are used by the automotive industry and other mass production industries, such as the appliance industry, to attach various parts to a metal panel, such as a bracket, frame member, or the like. Examples of pierce nuts are shown in U.S. Pat. Nos. 3,299,500 and 3,315,138, assigned to the assignee of this application. The prior art also includes a number of self-riveting nuts, including nuts having an annular skirt or barrel portion, wherein the free end of the barrel portion is deformed radially outwardly in a die member to form a mechanical interlock between the nut fastener and the panel as disclosed, for example, in U.S. Pat. Nos. 4,398,239 and 4,018,257. The self-riveting nuts disclosed in such patents are, however, secured to a panel in a pre-pierced panel opening, requiring two separate operations. The method of installing the nut fastener disclosed in these patents also require very precise centering of the nut relative to the pre-pierced panel opening, wherein a spring-biased pin is received through the panel opening and the nut is centered on the pin, prior to installation. Further, the nut and panel installation does not have sufficient pull-out strength for many applications. U.S. Pat. No. 3,926,236, also assigned to the assignee of this application, discloses a method of attaching a nut wherein the panel is pierced by a punch which extends through the nut bore to pierce and secure the nut in a continuous operation. However, the fastener is not a riveting-type fastener having a barrel portion extending through the pierced panel opening. Self-riveting fasteners have also been used by the container industry, for example, for attaching a flange or tag ring for reception of a threaded plug as disclosed, for example, in U.S. Pat. No. 3,800,401.

This application and the above-identified related patents and patent applications disclose methods and apparatus for permanently attaching male and female fasteners to a panel, such as nuts and bolts, in a continuous operation. The preferred methods of installation and installation apparatus do not require pre-piercing of the panel, although self-attaching fastener elements of this type may be installed in a pre-pierced panel opening. Certain difficulties have, however, been experienced in installing female fastener elements in a panel, particularly where the barrel portion of the female element is used to pierce the panel opening. As will be understood, if the female fastening element is a nut-type fastener, the bore of the nut must remain clear of obstructions following installation for receipt of a stud or bolt. The method of installation and installation apparatus is also preferably suitable for mass production applications, such as used by the automotive and appliance industries.

Self-riveting fasteners of the type disclosed herein are particularly strong in resisting pull-out and cam-out of the fastener from the panel. Pull resistance is tested by threading a bolt in the threaded bore of the female fastener and pulling in a direction opposite to the direction of installation. The pull-out strength in many applications is greater than the tensile strength of the bolt. Cam-out is the strength of the installation to a cantilevered load. However, certain applications, such as automotive seat track and belt applications, also require improvements in push-through strength and resistance to torque. Resistance to torque is generally provided by barbs or ribs on the body of the fastening element which may result in stress cracks in the panel.

Further, in most applications, it is desirable for the fastener to be installed flush or slightly below the metal panel. These objects were achieved with the nut fastener and method of installation disclosed in the parent application of this application, Ser. No. 092,593; however, the piercing of the panel through the nut bore as disclosed resulted in further problems with the installation tooling, particularly in mass production applications. The female die which receives the punch and cooperates with the punch to pierce the panel and form the nut barrel into a mechanical interlock with the panel was subject to failure from stress cracks in the die post surrounding the bore. This problem could be alleviated by using a punch or quill having a smaller diameter; however, the punch was then subject to breaking. Further, a slight misalignment between the die button and the punch may result in a poor installation. Finally, stresses were generated in the panel surrounding the hole which receives the nut, sometimes resulting in stress cracking.

There was, therefore, a need to improve the method of installation and installation apparatus to eliminate these problems, including punch or quill and die button breakage, panel stress cracking, and misalignment between the punch and die button resulting from normal tolerance build-up in mass production applications. The method of assembly and installation apparatus of this invention accomplishes these additional objectives and results in an improved female fastener and panel assembly. Other advantages and meritorious features of this invention will be more fully understood from the following description of the preferred embodiments, appended claims and drawings, a brief description of which follows.

BRIEF DESCRIPTION OF THE DRAWINGS

FIG. 1 is a side perspective view of a self-attaching nut fastener of the general type useful in the method of this invention;

FIG. 2 is an end view of the self-attaching nut fastener of FIG. 1;

FIG. 3 is a cross-sectional view of the self-attaching nut fastener shown in FIGS. 1 and 2;

FIG. 4 is a side cross-sectional view of the nut fastener shown in FIGS. 1 to 3 following installation of the fastener in a metal panel;

FIG. 5 is a partial side view of a preferred embodiment of the punch used in the method and apparatus of this invention;

FIG. 6 is a side partially cross-sectioned view of one embodiment of the installation apparatus of this invention installing the fastener illustrated in FIGS. 1 to 3; and FIGS. 7 to 10 are side partial cross-sectional views similar to FIG. 6 illustrating the installation method and apparatus of this invention illustrating sequentially the installation of a female fastener element in a panel utilizing the method and apparatus of this invention.

DESCRIPTION OF THE PREFERRED INSTALLATION APPARATUS AND METHOD OF THIS INVENTION

The embodiment of the self-riveting female fastener element 20 shown in FIGS. 1 to 3 includes a body portion 22, a tubular barrel portion 24 and a radial flange portion 26 integral with the body portion 22. As described more fully in the above-referenced related patents, the free end 28 of the barrel portion 24 preferably includes a chamfer which extends radially outwardly from the internal surface 31 of the barrel portion 24 to the arcuate bearing surface 34. The body portion 22 in the disclosed embodiment includes an internally threaded bore 32 which is coaxially aligned with the internal cylindrical surface 31 of the tubular barrel portion 24. The bore 32 may, however, be unthreaded, for example, to receive a thread forming screw or bolt. The body portion further includes a conical exterior lead-in surface 36, a plurality of flats 38, forming a polygonal surface which resists torque or turning of the fastener in fastener and panel assembly shown in FIG. 4, and a plurality of grooves 40 which extend through the junction of the flat surfaces 38 into the conical surface 36 and into the flange portion 26 as best shown in FIG. 1. As described more fully in the above-referenced parent application, the combination of flat surfaces 38 and grooves 40 provide improved torque resistance of the fastener 20 in the panel.

FIG. 4 illustrates the female fastener element 20 of FIGS. 1 to 3 installed in a panel 44. The panel portion 46 surrounding the panel opening is received in a U-shaped portion 50 deformed in the tubular barrel portion 24 formed at the free end 28 of the barrel portion. The U-shaped portion 50 forms a secure mechanical interlock between the fastener element and the panel and the body portion 22 and barrel portion 24 are received in a tubular panel portion 48 formed in the panel during the installation of the fastener element in the panel to provide a flush installation or slightly below the panel, as described below. As shown, the tubular panel portion 48 is received into the grooves or channels 40 to prevent rotation of the fastener element 20 in the panel following installation, FIGS. 5 to 10 illustrate a preferred embodiment of the installation apparatus and method of this invention, including the steps of installing a female fastener element of this type in a panel 44.

FIG. 5 illustrates a preferred embodiment of the punch or piercing quill 52. The punch 52 includes a cylindrical portion 54, which may have a shape other than cylindrical, a tapered or conical portion 56 and a cylindrical end portion 58. The cylindrical end portion 58 preferably has a diameter which is substantially less than the diameter of the internal surface 31 of the female fastening element 20. The conical portion 56 has a minor diameter 60 which is generally equal to the diameter of the cylindrical portion 58 and a major diameter at 62 which is greater than the internal diameter of the threaded bore 32 of the fastener element, which in the disclosed embodiment is the crest diameter of the threads. The effective diameter of the conical portion 56 will be a function of the panel thickness and the nut size; however, the conical punch utilized in the installation apparatus of this invention is specifically designed to accommodate various nut sizes and panel thicknesses. In a typical application, the conical portion 56 is tapered outwardly from the cylindrical portion 58 at an angle of about 2.5° and the tapered portion should be finish ground and formed of tool steel. The cylindrical end portion 58 is provided to assure accurate grinding of the conical portion 56. The cylindrical portion may be any convenient length.

FIG. 6 illustrates an installation apparatus for installing a self-riveting female fastener element 20 generally as shown in FIGS. 1 to 3. The disclosed embodiment of the installation apparatus includes an installation head 66 and a female die member or die button 68. The installation head includes a nose member 70 which engages the panel 44 during installation of the fastener element, a plunger passage 72, which receives the fastener element during installation and a reciprocable plunger 74 which engages the flat driven face 42 of the fastener element. In the disclosed embodiment, the die button assembly includes a body portion 76, a moveable die member 78 having an annular concave die cavity 80 and a projecting central die post 82 and an axial bore 84 which receives the piercing quill or punch 52, as described below. The disclosed embodiment of the die button assembly 68 further includes a base member 86 having an axial bore 87 coaxially aligned with the bore 84 of the die member 78 and the die member 78 includes a tubular extension 88 which is telescopically received in the bore 87 of the base member 86. The die member 78 is resiliently biased upwardly in FIG. 6 by a coil spring 90 and the relative upward movement of the die member is limited by stop surface 92.

In a typical application, the installation head 66 is attached to the upper die shoe of a die platen (not shown) and the die button assembly 68 is received in a configured opening in the lower die shoe (not shown). As described more fully in the above-referenced related patents and patent applications, a self-riveting fastener element 20 is installed with each stroke of the die press. As will be understood, however, the method of this invention may be utilized with any conventional die press and the entire assembly may be reversed, such that the self-riveting fastener element 20 is installed upwardly in the die press. The method of this invention will now be described with reference to FIGS. 6 to 10. In a normal operation, the panel 44 is first received on the annular panel supporting surface 94 of the body portion 76. In many applications, the panel will be clamped in place on the die shoe to prevent any relative movement of the panel during the installation of the fastener element 20. The fastener element is then received in the plunger passage 72 and the plunger 74 moves the fastener until the free end 28 of the fastener element engages the panel 44, as shown in FIG. 6. The fastener element is now ready for installation. As shown, the tubular barrel portion 24 of the fastener element 20 is coaxially aligned with the concave annular die cavity 80 and the die post 82 is coaxially aligned with the internal surface of the barrel portion to receive the barrel portion, as described below.

The piercing quill or punch 52 is then driven downwardly against the panel 44, as shown by arrow 96 in FIG. 7, causing the end 58 of the punch to pierce the panel. The panel is pierced between the outer surface of the end 58 of the punch and the internal surface of the die bore 84 and the die member 78 is moved downwardly against the force of the return spring 90, as shown by arrow 98. This is done to entrap the slug so that it is not dropped prematurely. The free end 28 of the tubular barrel portion 24 remains in contact with the panel 44; however, the fastener element 20 is not driven into the panel by the plunger 74 during this step of the method of this invention.

The end 58 of the punch is then driven through the panel, piercing a slug 98 from the panel, as shown in FIG. 8. The conical portion 56 is then driven into the opening 100 formed in the panel 44, enlarging the panel opening before receipt of the barrel portion 24 of the fastener element 20, as shown in FIG. 8. The plunger 74 is then driven downwardly against the driven face 42 of the fastener element 20 as shown by arrow 102, driving the free end 28 of the barrel portion against the panel, which deforms the panel portion adjacent the panel opening 100 downwardly into a tubular shape 48, as shown in FIG. 9. The die member 78 is then bottomed against the face member 86. The tubular barrel portion 24 of the fastener element 20 is substantially simultaneously received in the annular concave die cavity 80, which deforms the free end 28 of the barrel portion radially outwardly onto a U-shaped 50, as shown in FIG. 10, entrapping the edge 46 of the panel, and forming a secure mechanical interlock, as described above in regard to FIG. 4. Details of the installation apparatus not shown are disclosed in the above-referenced related applications and patents.

The diameter of the cylindrical portion 54 of the punch 52 is nearly equal to the internal diameter of the bore through the reciprocable plunger 74. As set forth above, the major diameter 62 of the punch is preferably larger than the internal diameter of the female fastener element bore 32 to accommodate different fastener sizes and panel thicknesses. The installation head 66 is set to drive the punch 52 through the fastener element bore 32 until the conical portion 56 is nearly equal to the internal diameter of the fastener bore 32 at the opening to the fastener bore, which is the effective diameter "D" of the conical portion 56 in any installation.

The method of this invention then includes supporting a metal panel 44 on a die member 78 having an axial bore 84 and a concave annular die cavity 80 surrounding the die bore; then, locating the free end 28 of the fastener element adjacent the panel 44, opposite the die member 78, with the free end 28 of the fastener dement facing the panel; then driving the free end 58 of the punch through the fastener dement bore 32 against the panel to pierce a slug 98 from the panel, forming an opening in the panel having a diameter substantially less than the diameter of the tubular barrel portion 24; continuing to drive the conical portion 56 of the punch through the panel hole, to enlarge the hole, as shown in FIG. 8; then driving the free end 28 of the barrel portion 24 against the panel, to further enlarge the panel opening; and, substantially simultaneously deforming the free end 28 of the fastener element radially outwardly in the concave annular die to form a mechanical interlock between the barrel portion 50 and the panel portion 46, forming a secure mechanical interlock between the panel and the riveting portion of the fastening element.

This method substantially improves the life of the installation tooling because, as set forth above, the conical portion 56 of the punch reduces punch breakage while permitting the use of a larger opening 84 through the die member, thereby reducing die button breakage. Further, the enlargement of the panel opening before the barrel portion 24 is driven through the panel opening, reduces stresses in the panel and thereby reducing stress cracking of the panel. The conical surface 56 of the punch also compensates for some misalignment between the punch 52 and the die button 78. Such misalignment may result from tolerance build-up in the die press, as set forth above. The conical surface 52 accurately guides the punch 52 into the nut bore if there is a slight misalignment, permitting the use of a larger diameter punch, which is very important to the method of this invention.

As will be understood, various modifications may be made to the installation apparatus and method of this invention within the purview of the appended claims. For example, the method and apparatus of this invention may be utilized with different nut configurations as disclosed, for example, in the above-identified patents. Further, the die button assembly 68 may be modified to include a fixed die 78 and, as set forth above, the self-attaching fastener element 20 may be installed upwardly in a die press. The fastener element installation apparatus and method of this invention therefore achieves the several objects of the invention set forth above, including improved installation apparatus life and an improved fastener and panel assembly. The method and apparatus of this invention may be utilized to install fastener elements of the type disclosed herein in steel panels normally used by the automotive and appliance industries, including brackets and including relatively thin metal panels such as now used by the automotive industry for body panels. Having thus described the improved method of attaching a female fastener element to a metal panel and improved installation apparatus, the invention is now claimed as set forth below.

We claim:

1. A method of attaching a female fastener element to a plastically deformable metal panel, said fastener element including a body portion having a bore therethrough and an annular riveting portion integral with said body portion having an opening therethrough coaxially aligned with said body portion bore and said riveting portion having a free annular end portion, said method comprising the following steps:

supporting said panel on a die member, said die member having an axial bore and a concave annular die cavity generally surrounding said die bore;

locating said riveting portion free end of said fastener element adjacent said panel opposite said die member with said fastener element riveting portion coaxially aligned with said die member bore;

driving a free end of a punch through said fastener element bore against said panel to pierce a slug from said panel, said punch free end having a diameter substantially less than the diameter of said fastener element bore and said punch forming a hole through said panel and said punch having a generally smooth conical outer surface having a minor diameter adjacent said punch free end;

driving said punch conical outer surface through said panel hole into said die member bore thereby enlarging said panel hole and substantially simultaneously driving said free end of said fastener element riveting portion against said panel adjacent said panel hole thereby enlarging said hole and deforming a portion of said panel into said concave annular die cavity and forming a mechanical interlock between said panel and said riveting portion of said fastener element.

2. The method of attaching a female fastener element to a metal panel as defined in claim 1, wherein said method includes driving said punch through said fastener element bore until the diameter of said punch along said conical surface is nearly equal to but less than the diameter of said fastener bore at the opening to said fastener bore.

3. The method of attaching a female fastener element to a panel as defined in claim 1, wherein said die member includes a central projecting annular die post adjacent to and surrounding said die bore, said die post having an outer surface blending into said annular concave die cavity and forming an inner surface of said die cavity, said method including driving said punch conical outer surface through said panel hole and substantially simultaneously driving said fastener element riveting portion free end against said panel to enlarge said panel hole and to receive said die post through said panel hole, then driving said fastener element riveting portion against said die member concave die cavity thereby deforming said riveting portion free end radially outwardly to form a mechanical interlock between said fastener element riveting portion and said panel portion.

4. The method of attaching a female fastener element to a metal panel as defined in claim 3, wherein said annular concave die cavity is arcuate in cross section, said method including driving said annular riveting portion free end of said fastener element against said concave die cavity, thereby deforming said riveting portion free end into an annular U-shaped end portion receiving said panel portion adjacent said panel hole and forming said mechanical interlock.

5. The method of attaching a female fastener dement to a panel as defined in claim 3, wherein said body portion of said fastener element includes a flange portion opposite said riveting portion having an outer diameter greater than said annular riveting portion, said method further including driving said fastener element flange portion into said panel, thereby deforming said panel around said flange portion to mount said fastener element with said flange portion below said panel.

6. The method of attaching a female fastener element to a metal panel as defined in claim 3, wherein said method includes driving said punch through said fastener element bore to deform said panel against said die post free end, then continuing to drive said punch free end against said panel to pierce said slug from said panel.

7. The method of attaching a female fastener element to a panel as defined in claim 1, wherein said punch conical outer surface has a major diameter greater than said fastener element bore, said method including driving said punch into said fastener element bore until the diameter of said punch along said conical outer surface of said punch is nearly equal to, but less than said fastener element bore, then withdrawing said punch.

8. A method of attaching a female fastener element to a plastically deformable metal panel, said fastener element including a body portion having a central bore therethrough and an annular riveting portion integral with said body portion having an opening therethrough coaxially aligned with said body portion bore, and said riveting portion having a free annular end portion, said method comprising the following steps:

supporting said panel on a die member, said die member having a central bore, a concave annular die cavity generally surrounding said bore and a central annular die post adjacent to and surrounding said die bore, said die post having an outer surface blending into said annular concave die cavity;

locating said riveting portion free end of said fastener element adjacent said panel opposite said die member with said fastener element annular riveting portion coaxially aligned with said die member bore;

driving a free end of a punch through said fastener element bore against said panel thereby deforming said panel against said die post free end, said punch free end having a diameter substantially less than said fastener element bore and a generally smooth conical outer surface having a minor diameter adjacent said punch free end;

continuing to drive said punch free end against said panel to pierce a slug from said panel thereby forming a hole through said panel having a diameter less than said outer surface of said die post;

driving said punch conical outer surface through said panel hole into said die member bore thereby enlarging said panel hole and substantially simultaneously driving said free end of said fastener element riveting portion against said panel adjacent said panel hole, enlarging said panel hole and deforming a portion of said panel into said concave annular die cavity and forming a mechanical interlock between said panel portion and said riveting portion of said fastener element.

9. The method of attaching a female fastener element to a metal panel as defined in claim 8, wherein said method includes driving said punch through said fastener element bore until the diameter of said punch along said conical surface is nearly equal to, but less than said fastener element bore at an opening to said fastener element bore adjacent an end of said fastener element receiving punch.

10. The method of attaching a female fastener element to a metal panel as defined in claim 8, wherein said annular concave die cavity is arcuate in cross section, said method including driving said annular riveting portion free end of said fastener element against said concave die cavity surface, thereby deforming said riveting portion free end into an annular U-shaped end portion receiving said panel adjacent said hole and forming said mechanical interlock.

11. The method of attaching a female fastener element to a metal panel as defined in claim 8, wherein said body portion of said fastener element includes a flange portion opposite said riveting portion having an outer diameter greater than said annular riveting portion, said method including driving said fastener element flange portion into said panel, thereby deforming said panel around said flange portion and forming a flush mounting of said fastener element in said panel.

12. The method of attaching a female fastener element to a panel as defined in claim 8, wherein said body portion of said fastener element includes a flange portion opposite said riveting portion having an outer diameter greater than said annular riveting portion, said method further including driving said fastener element flange portion into said panel, thereby deforming said panel around said flange portion to mount said fastener element with said flange portion below said panel.

13. The method of attaching a female fastener element to a metal panel as defined in claim 8, wherein said punch conical outer surface has a major diameter greater than said fastener element bore, said method including driving said punch into said fastener element bore until the diameter of said punch along said conical outer surface is nearly equal to, but less than said fastener element bore, then withdrawing said punch.

14. A method of attaching a female fastener element to a plastically deformable metal panel, said fastener element including a body portion having a bore therethrough and an annular riveting portion integral with said body portion having an opening therethrough coaxially aligned with said body portion bore, and said riveting portion having a free annular end portion, said method comprising the following steps:

supporting said panel on a die member, said die member having a bore and a concave annular die cavity generally surrounding said bore;

locating said riveting portion free end of said fastener element adjacent said panel opposite said die member with said fastener element bore riveting portion opening coaxially aligned with said die member bore;

driving a free end of a punch through said fastener element bore against said panel to pierce a slug from said panel, said punch free end having a diameter less than said fastener element bore thereby forming a hole through said panel and said punch having a generally smooth conical outer surface extending from adjacent said punch free end;

driving said punch conical outer surface through said panel hole into said die member bore, thereby enlarging said panel hole, until the diameter of said conical outer surface of said punch in said fastener element bore is nearly equal to, but less than said fastener element bore, and substantially simultaneously driving said free end of said fastener element riveting portion against said panel adjacent said panel hole thereby deforming a portion of said panel into said annular die cavity and deforming said free end of said fastener element to form a mechanical interlock between said panel and said riveting portion of said fastener element.

15. The method of attaching a female fastener element to a metal panel as defined in claim 14, wherein said die member includes a central projecting annular die post adjacent to and surrounding said die bore, said die post having an outer surface blending into said annular concave die cavity and forming an inner surface of said die cavity, said method including driving said punch conical outer surface through said panel hole and substantially simultaneously driving said fastener element riveting portion free end against said panel to enlarge said panel hole and to receive said die post free end through said panel hole, then driving said fastener element riveting portion free end against said die member concave die cavity deforming said riveting portion free end radially outwardly to form said mechanical interlock between said fastener element riveting portion and said panel.

16. The method of attaching a female fastener element to a metal panel as defined in claim 14, wherein said annular die cavity is arcuate in cross section, said method including driving said annular riveting portion free end of said fastener element against said concave die cavity, thereby deforming said riveting portion free end into an annular U-shaped end portion receiving said panel and forming said mechanical interlock.

17. The method of attaching a female fastener element to a metal panel as defined in claim 14, wherein said punch conical outer surface has a major diameter greater than said fastener element bore, said method including driving said punch through said fastener element bore until the diameter of said punch along said conical outer surface in said fastener element bore is nearly equal to, but less than said fastener element bore, then withdrawing said punch.

* * * * *